April 3, 1928.                                         1,664,642
G. N. RANDLE
URINAL FOR AUTOMOBILES AND THE LIKE
Filed Nov. 30, 1925
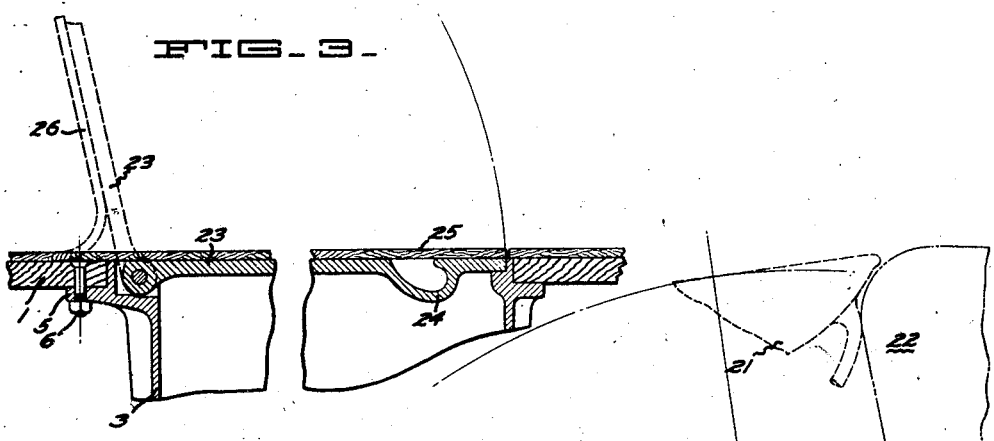
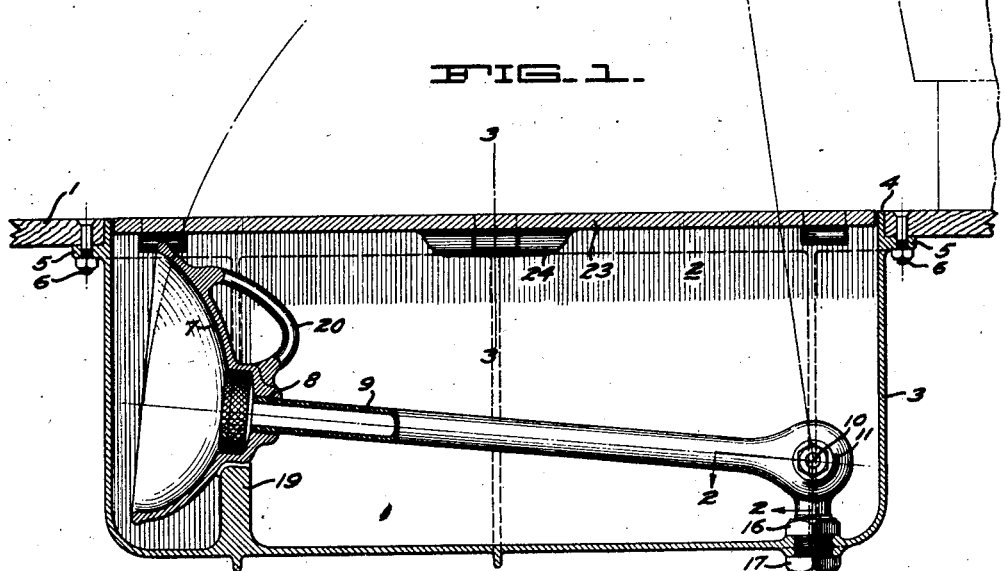
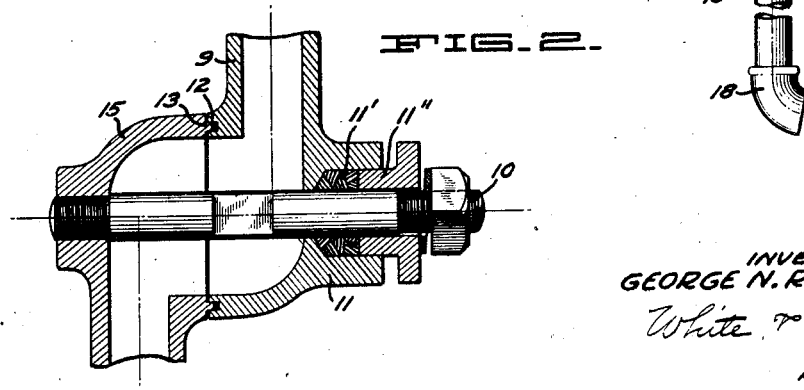
INVENTOR
GEORGE N. RANDLE
HIS ATTORNEYS Patented Apr. 3, 1928.

1,664,642

UNITED STATES PATENT OFFICE.

GEORGE N. RANDLE, OF OAKLAND, CALIFORNIA.

URINAL FOR AUTOMOBILES AND THE LIKE.

Application filed November 30, 1925. Serial No. 72,076.

This invention relates to a urinal for automobiles and the like and has for its object the provision of a simple and efficient device of this character.

More particularly, the invention aims to provide a urinal which is normally positioned underneath the floor of the automobile so as to be out of sight and out of the way, and which is readily accessible for use by simply raising a trap door in the floor which normally covers the device, and then raising the device about a hinged connection to a substantially vertical position convenient for use, after which the device may be quickly replaced in its normal position and covered by the trap door.

The invention possesses other advantageous features, some of which with the foregoing, will be set forth at length in the following description where I shall outline in full that form of my invention which I have selected for illustration in the drawings accompanying and forming part of the present specification. In said drawings I have shown one form of urinal embodying my invention, but it is to be understood that I do not limit myself to such form, since the invention, as set forth in the claim, may be embodied in a plurality of forms.

Referring to the drawings:—

Figure 1 is a fragmentary longitudinal section of an automobile floor, with parts in elevation illustrating a urinal and its associated parts embodying my invention, in its normal position of non-use, a portion of the device in its raised position being indicated in dotted lines.

Fig. 2 is an enlarged sectional view taken on the line 2—2 of Fig. 1 illustrating details of the hinged connections between the device and its discharge outlet; and Fig. 3 is a section taken on the line 3—3 of Fig. 1 illustrating the cover for the device, an intermediate portion being broken away in order to reduce the size of the drawing.

As best shown in Fig. 1, the floor 1 of an automobile is provided with an opening 2, preferably rectangular in form, and of the same shape and size as a casing 3 which houses the urinal proper. The upper edge 4 of the casing is adapted to fit snugly against the edge of the opening 2 flush with the upper surface of the floor, and is formed with an exterior shoulder 5 adapted to fit against the lower side of the floor adjacent the opening. The casing 3 is preferably formed of a suitable metal, with a bottom and side walls and an open top and is supported on the lower side of the floor 1 by means of bolts 6 which secure the shoulder 5 to the floor. The urinal comprises a basin 7 of suitable form, having an internally threaded opening 8 in its bottom, into which is screwed a tube 9. The opposite end of the tube 9 is pivoted on a bolt 10 so as to permit the movement of the device about said bolt in a vertical plane. Preferably, the housing 3 is positioned longitudinally on the automobile, with the bolt 10 parallel with the wheel axes, the bolt 10 being located adjacent the rear end of the casing.

The tube 9 is provided with a bend 11 at its pivoted end, and provided with a slot 12 adapted to receive a shoulder 13 on an outlet pipe 15 which extends through the bottom of casing 3, a supply of grease being introduced into the slot 12 to lubricate the joint and prevent leakage. The tube 9 and pipe 15 are secured together by means of the bolt 10, so as to permit the rotation of the tube 9 thereon, and on the shoulder 13, as best shown in Fig. 2. Preferably the bend 11 is also provided with a packing box 11' and gland 11" as shown. The pipe is secured to the casing 3 by lock nuts 16, 17 and is provided at its free end with a suitable bend 18, directed toward the rear of the automobile so that when the automobile is in motion, the air passing over the same will ventilate and create a suction within the same so as to facilitate the flow of fluid therethrough.

The casing 3 is provided with a support 19 on which the basin 7 rests when stored within the casing 3, as shown in Fig. 1. The casing 3 is of sufficient size so as to permit the basin 7 to be housed therein below the floor surface. The basin 7 may be provided with a handle 20 for convenience in moving the same about its pivot 10, from the position of non-use shown in Fig. 1 to its position for use indicated partly in dotted lines at 21, in which case the basin rests against the forward end of the seat 22, with its upper edge substantially level with the seat. The casing 3 is closed by a suitable door 23, which is hinged thereto preferably for movement at right angles to the movement of the basin. The door is provided with a depressed handle 24 for moving the same, and covered with the usual carpet 25 in the automobile. The carpet is cut at the forward edge and along the two sides of the door when in its closed position, and when the door is raised the carpet is moved rearwardly over the door as indicated at 26 in Fig. 3.

In view of the foregoing detailed description the operation of the device will be apparent without further remarks.

I claim:

In an automobile having a floor, an elongated casing extending longitudinally of said automobile, an outlet pipe secured to said casing and opening to the rear of said vehicle, a tube pivoted at one end to said outlet pipe and adapted in one position to lie within said casing, a basin on the other end of said tube, and a support in said casing for holding said tube inclined downwardly toward said outlet pipe.

In testimony whereof, I have hereunto set my hand.

GEORGE N. RANDLE.